Sept. 18, 1951     D. A. SEAVER     2,568,371
BOTTLE CONTAINER
Filed April 23, 1949

INVENTOR
Donald A. Seaver
BY
H. F. Johnston
ATTORNEY

Patented Sept. 18, 1951

2,568,371

UNITED STATES PATENT OFFICE 2,568,371

BOTTLE CONTAINER

Donald A. Seaver, West Cheshire, Conn., assignor to Scovill Manufacturing Company, Waterbury, Conn., a corporation of Connecticut Application April 23, 1949, Serial No. 89,210

12 Claims. (Cl. 215—12)

This invention relates to containers and particularly to a container adapted to hold a perfume bottle or the like.

One of the objects of this invention is to provide an improved metal container for a bottle that will serve as a protecting guard and may also be embellished in any desirable manner to provide an attractive dress for said bottle.

Another object is to provide improved means for holding together the two main enclosure parts of the bottle container which also holds the bottle firmly in position so that it will not rattle inside the container.

Another object is to provide a bottle container made from two cupped shells with their bases forming the opposite ends of the container and with their open ends abutted together at an intermediate part of the container and so held in place by an interior spring spider member.

In more detail, my invention provides a container having ornamental characteristics formed outwardly from the side walls and wherein an interior spider member, provided to hold the bottle in the container, is formed with fingers having projecting ribs and ribs of various arrangements to interengage with the interior walls and also with the ornamental characteristics of the shells to prevent the shell parts from easily pulling axially apart or being rotated relative to each other.

The full nature of this invention along with other objects and various advantages thereof will be more apparent from a consideration of the following description when read in connection with the accompanying drawing, in which Fig. 1 is a perspective view of the container.

Figure 1:
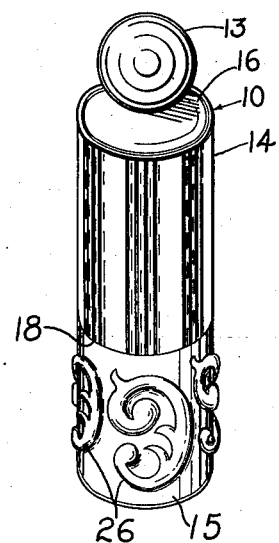

Referring now to the drawing in which like numerals designate like parts throughout the several views, the numeral 10 indicates generally a hollow container within which is confined a glass bottle or vial 11, such as is used for perfumes or like substance. The bottle 11 is provided with the usual threaded neck 12 which may be closed by any form of ornamental screw cap 13.

The container 10 comprises two cup-shaped shells, an upper shell 14 and a lower shell 15, the upper shell having a partially closed end 16 comprising the top of a container and the lower shell having a closed end 17 comprising the base of a container. The two shells 14 and 15 are positioned so that their open ends are abutted together on a juncture line 18 (Fig. 1). The closed top end of the upper shell is provided with an opening 19 through which the threaded neck 12 of the bottle 11 is adapted to project a sufficient distance to receive the screw cap 13.

Figure 5:
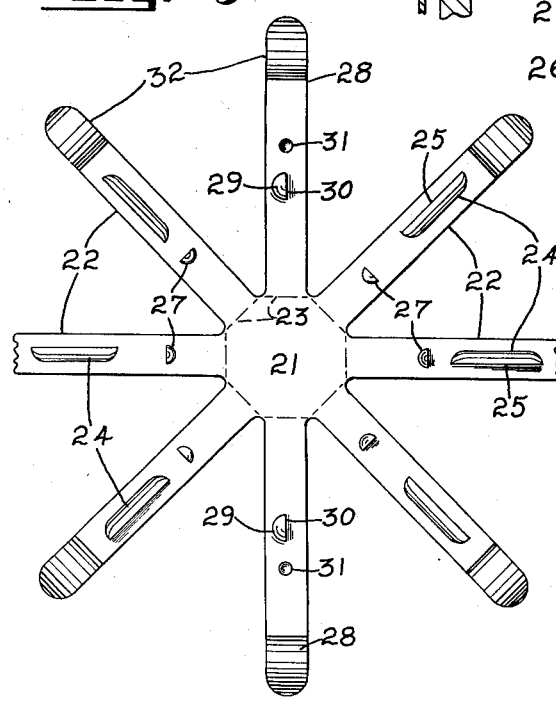
Fig. 5 is a development plane view of the spider member with end portions of some of the fingers broken away.

To hold the bottle in the container and also provide for a protecting guard, use is made of a spider member 20. This spider member is best shown in its development view, Fig. 5, and consists of a central base portion 21 having a series of elongated radial fingers 22 extending therefrom and adapted to be bent at right angles to the base along the fold lines 23. A certain number, but not all of the radial fingers 22, at their mid portions are provided with longitudinal ribs 24 which have a degree of resiliency because they are constructed by making a longitudinal slit 25 in the body of the fingers and forming up the rib on only one side of the slit; this particular forming of the ribs being best shown in Fig. 3.

It is to be noted that the ribs 24 are so formed that their raised slit edges are opposed relative to each other in alternate adjacent fingers so as to present relatively sharp edges along the high points of said ribs for reasons as will appear later. The ribs 24 are also positioned on the fingers 22 so as to be located at the juncture line 18 between the two shells 14 and 15 and extend a substantial distance in opposite directions from that point. The shells 14 and 15 are adapted to telescope over the high points of the ribs 24 and are thereby frictionally held together. In view of the fact that some ribs lie entirely to one side of the finger slits 25 in one direction and others in an opposite direction they will thus present sharp edges in opposed relationship to the inner walls of the shells 14 and 15 and prevent relative rotation of the said shells 14 and 15.

Figure 2:
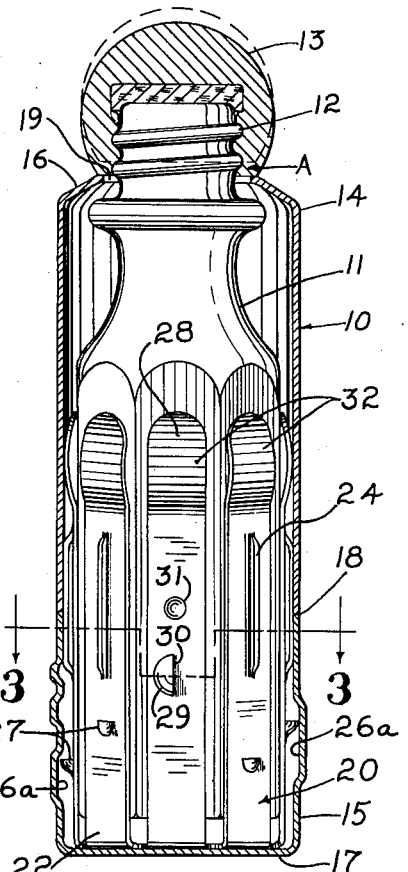
Fig. 2 is a vertical section through the container shell but showing the interior spider member and bottle in full elevation.

As shown in Fig. 1 the lower shell 15 may be embossed with ornamental characteristics 26 which are impressed outwardly from the inside of said shell so as to leave corresponding indentations 26a on the inside of the shell. In order to assure a relatively firm anchorage for the spider member 20 within the lower shell 15 the radial fingers 22, having the longitudinal slit ribs 25, are also provided with slit nibs 27 which nibs are so formed as to present their sharp edges upwardly as shown in Fig. 2, and the nibs are also staggered relative to each other in adjacent fingers. This is in order to allow the slit nibs 27 to engage haphazardly against the shoulder edges of any of the indentations of the ornamental characteristics that they may perchance lie adjacent to. (See Fig. 2.)

Figure 4:
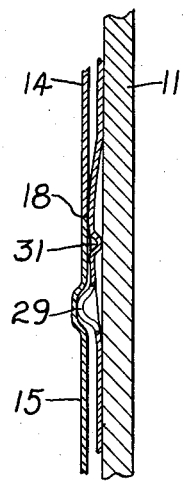
Fig. 4 is a vertical section through a portion of the container, the spider member and embraced bottle, the view taken along the line 4—4 of Fig. 3.
Figure 3:
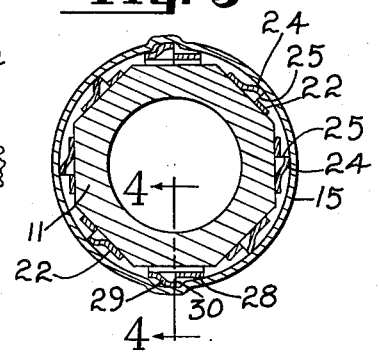
Fig. 3 is a transverse horizontal section taken along the line of 3—3 of Fig. 2.

Two of the other diametrical spring fingers, those that are not provided with the longitudinal slit ribs 25, and indicated by the numeral 28 are each provided with an outwardly formed knob type of sheared nib 29 which has its slit 30 longitudinal of and substantially on the center line of the spring fingers. As shown in Figs. 2 and 3 the sheared nibs 29 are positioned so as to engage in any of the indentations 26a provided on the inside of shell 15. Also said nibs 29 are formed so that they lie on the same side of a vertical plane passing through the fingers 28 and thus provide sharp edges on the high points of said nibs that are adapted to engage against the shouldered edges of the indentations 26a in the lower shell 15 in such a manner as to prevent relative rotation of the spider member 20 and embraced bottle in either direction within said container 10. In order to insure that these sheared nibs 29 will be forced outwardly into the indentations 26a, a rounded nub 31 is formed inwardly of the fingers 28 a short distance above the sheared nibs 29. When a bottle is assembled into the spider member 20 the nubs 31 are adapted to engage against the adjacent surface of the bottle 11 and cause a considerable portion of the fingers 28 including the sheared nibs 29 to be forced outwardly against the inside wall of said container 10. (See Fig. 4.)

The terminal ends of each of the fingers 22 and 28 are formed in arcuate shape as at 32 transversely of the finger longitudinal axes so as to increase the frictional factor between the inside wall of the upper shell 14 and the bottle 11, and also to assist in guiding the upper shell into position for assembly.

It is further to be noted that the design of this container and spider member is such that there is room within the container to permit axial movement of the bottle 11 therewithin. This is in order to allow the bottle to be telescoped further into the container in case there is any clearance space occurring between the lower edge of the cap 13 and the adjacent surface of the closed end 16 after the cap is screwed upon the bottle neck 12 as indicated at A in Fig. 2 and by the dotted line position of the screw cap 13, whereupon the cap may be pushed downwardly so as to have its lower end positioned flush with the upper surface of the closed end 16.

The bottle is here shown as being of polygonal shape, but it should be understood that the spider member is so designed as to accommodate a round bottle as well as an odd shaped one and function in the same manner.

While the form of invention herein shown and described embraces a preferred embodiment of the same it is to be understood that the construction may be varied as to mechanical details without departing from the spirit of the invention and the scope of what is claimed.

I claim:

1. In a container for a bottle having a projecting neck, two cup-shaped shells having their open ends abutted together at an intermediate section of the container, one of the shells having an opening provided in its closed end through which said projecting neck may extend, a spider member having a series of spring fingers for engaging said bottle and maintaining it in spaced relation to said shells, and means on said fingers over which said shells are frictionally telescoped to hold said shells in end-to-end assembled relationship.

2. A container as defined by claim 1 wherein said holding means are longitudinal ribs formed outwardly from the mid portion of said fingers.

3. A container as defined by claim 1 wherein said holding means are longitudinal ribs having one edge sheared and formed outwardly from the mid portion of said fingers for presenting a relatively sharp edge along one side of said ribs.

4. A container as defined by claim 1 wherein said holding means are longitudinal ribs having one edge sheared and formed outwardly from the mid portion of said fingers and the sheared edges of said ribs in adjacent fingers are opposed to each other.

5. A container for a bottle comprising two cup-shaped shells having their open ends abutted together at an intermediate section of the container, a spider member located within said container and having spring fingers for embracing said bottle, and means on said fingers for telescopically receiving the open ends of said shells and frictionally holding said shells in end-to-end relationship.

6. A container for a bottle having a projecting neck, said container comprising an upper shell and a lower shell having closed ends and having the open ends abutted together at an intermediate section of the container, said upper shell having an opening provided in its closed end through which said projecting neck extends, a spider member having a series of spring fingers adapted to grip said bottle and maintaining it in spaced relation to said container, the mid portion of said fingers having means on which the open ends of said shells are frictionally telescoped and held in end-to-end relationship, and nib means on said fingers for engaging the inner wall of said lower shell to prevent axial displacement of said spider member.

7. A container as defined by claim 6 wherein said nib means are sheared nibs presenting their sheared edges in an upward direction.

8. A container as defined by claim 6 wherein the ends of said fingers are of arcuate shape transversely of the fingers.

9. A container for a bottle having a projecting neck, said container comprising an upper shell and a lower shell having closed ends opposite to each other and having their open ends abutted together at an intermediate section of the container, said upper shell having an opening provided in its closed end through which said projecting neck extends, said lower shell having ornamental figures formed from the inside of said shell outwardly and providing corresponding indentations on the inside of said shell, a spider member having a series of spring fingers for engaging said bottle and maintaining it in spaced relation to said container, a plural number of opposed fingers having outwardly formed longitudinal friction ribs over which said open ends of said shells are telescopically assembled, said plural number of fingers also having sheared nibs with their sheared edges directed upwardly so as to engage in the indentations within said lower shell in a manner to make it difficult to remove the spider from said lower shell, and a pair of opposed fingers having sheared nibs with their sheared edges longitudinal of the fingers and facing in the same direction, said latter nibs also engaging in said indentation and serving to prevent rotation of said spider member in either direction in said lower shell.

10. In combination with a receptacle of a container comprising two cupped shells having closed ends in opposed relationship and open ends in abutted relationship, and a spring member embracing said receptacle and urged outwardly by said receptacle against the inner surfaces of said shells for holding the latter in tight frictional assembled relationship relative to each other.

11. The combination with a receptacle having a threaded neck and a closure cap for said threaded neck, of a container comprising two casing members having closed ends in opposed relationship and open ends in abutted relationship, one of said members having an opening in its closed end through which said threaded neck projects, and a spring spider member having several longitudinal fingers embracing said receptacle and of a length to engage a substantial length of the inside of both casing members, said fingers urged outwardly by said receptacle against the inner surface of said casing members for holding the latter in abutted assembled relationship relative to each other.

12. A container combination as defined by claim 11 wherein the body of the receptacle is shorter than the space formed by the united casing members and spider so that after assembly of said cap the receptacle may be further axially slipped within the container to bring the cap into abutted relationship with the closed end of said member through which said threaded neck projects.

DONALD A. SEAVER.

REFERENCES CITED

The following references are of record in the file of this patent:

UNITED STATES PATENTS

| Number | Name | Date |
|---|---|---|
| 1,121,349 | Goss | Dec. 15, 1914 |
| 1,186,544 | Carlson | June 13, 1916 |
| 1,186,545 | Carlson | June 13, 1916 |
| 1,478,711 | Hastedt | Dec. 25, 1923 |
| 1,508,309 | Arbahn | Sept. 9, 1924 |
| 1,855,039 | Wetmore | Apr. 19, 1932 |
| 2,364,753 | Richter | Dec. 12, 1944 |

FOREIGN PATENTS

| Number | Country | Date |
|---|---|---|
| 351,210 | Great Britain | June 25, 1931 |